Figure 1:
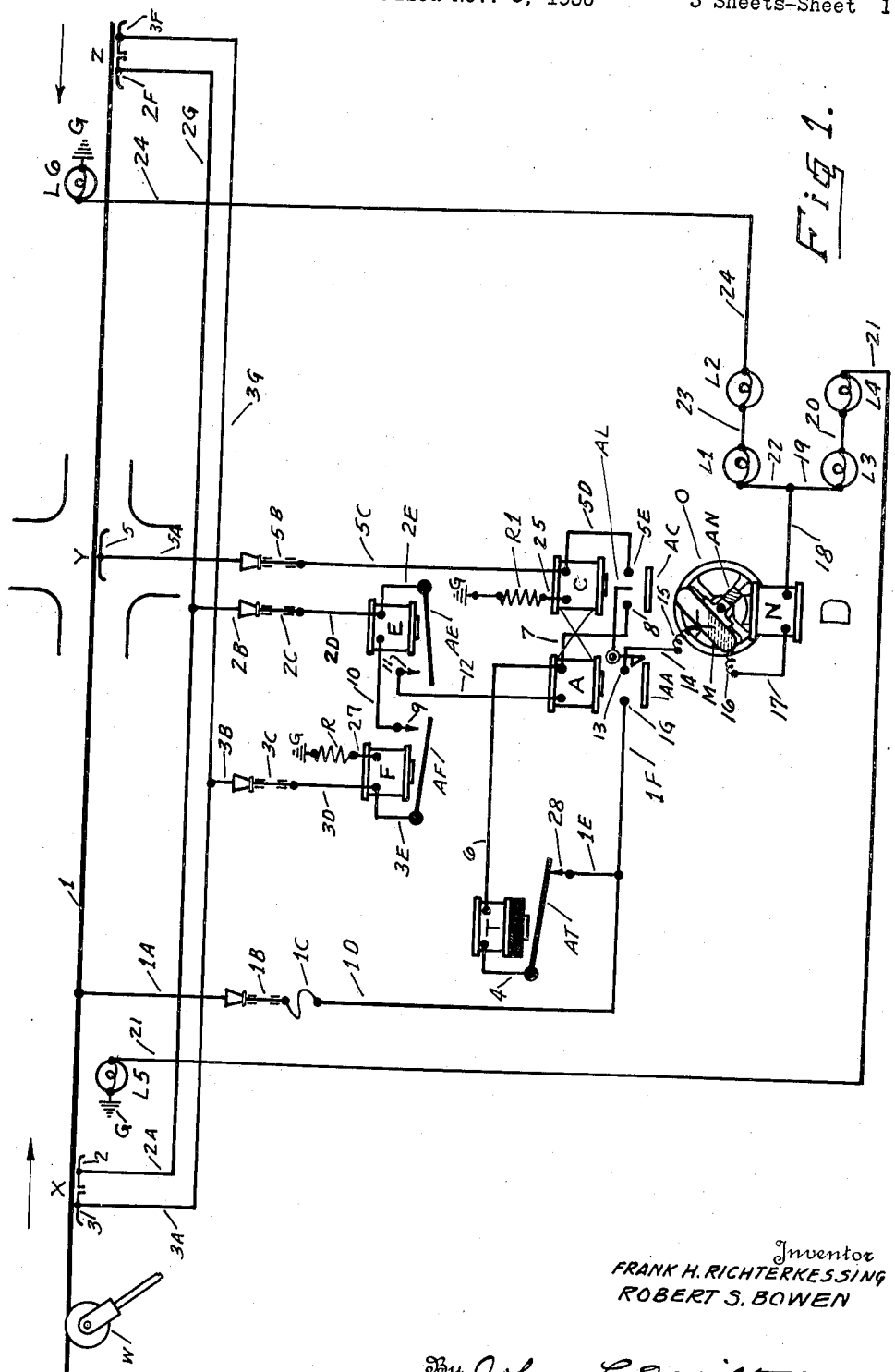

Patented June 27, 1933

1,915,696

UNITED STATES PATENT OFFICE

FRANK H. RICHTERKESSING, OF LOUISVILLE, KENTUCKY, AND ROBERT S. BOWEN, OF WEST NEWTON, MASSACHUSETTS, ASSIGNORS TO NACHOD & UNITED STATES SIGNAL CO., INC., OF LOUISVILLE, KENTUCKY, A CORPORATION OF NEW YORK

ELECTRIC SIGNAL CONTROL SYSTEM

Application filed November 8, 1930. Serial No. 494,298.

Our invention relates to improvements in trolley contact signaling systems, especially those adapted for use with warning devices installed at the intersection of a highway and an electric railway line.

In the accompanying drawings we have illustrated our invention as applied to trolley contact signaling systems, and have shown applications of our invention embodied in a signal system having means for operating signals on a single track electric railway, wherein it is desired to actuate the signal when a car is approaching the intersection in either direction. Also an embodiment of our invention as applied to a double track railway system in which it is desired to operate a signal upon the approach of a car on either track. It is obvious, however, that our system may be employed for operating signals not only in connection with overhead trolley wires, but where underground or third-rail conductors are employed. Our system is also applicable for operating a signal upon a passage of a car in one direction, and be inoperative when passing in the opposite direction.

In the drawings which illustrate the application of our invention—

Figure 2:
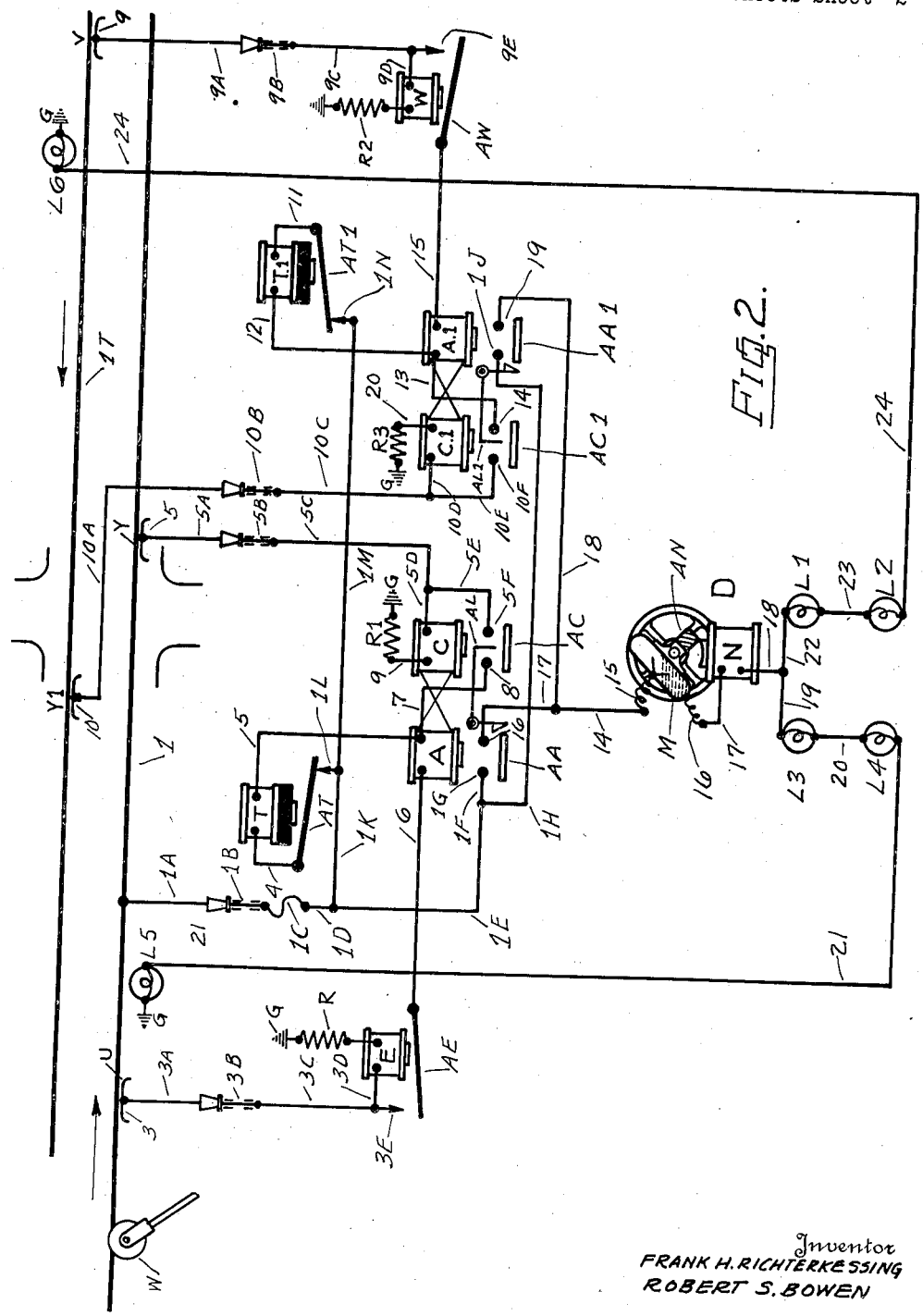
Figure 3:
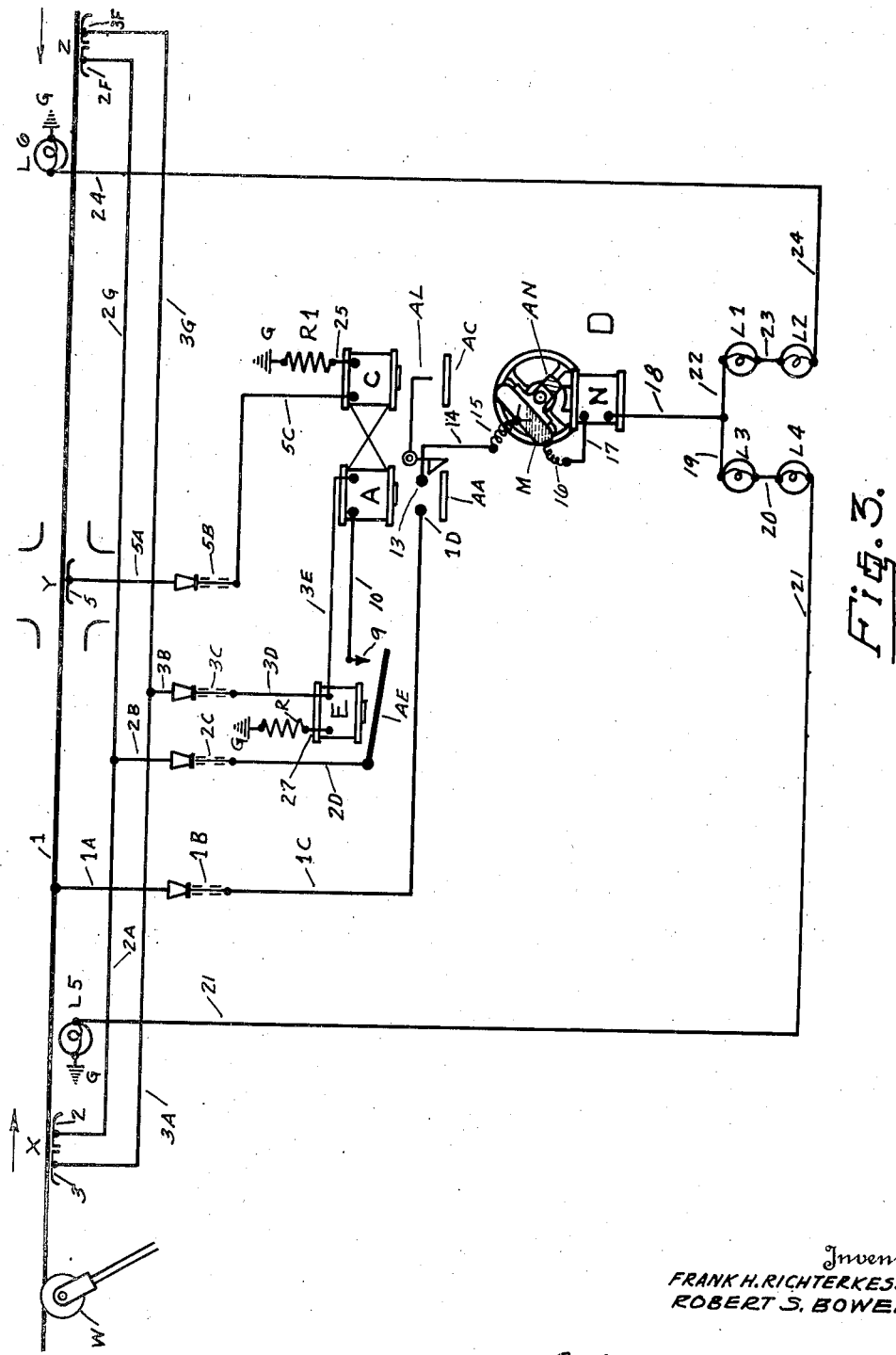

Figure 1 is a diagrammatic application of our invention as applied to a single trolley wire of a single-track railway, showing the signals and relays in their normal de-energized condition. Fig. 2 is a diagrammatic drawing showing the application of the system to a double-track railway system or a single-track system employing two trolley wires. One wire being employed for a car traveling in one direction, and the other wire being employed for a car traveling in the reverse direction. Fig. 3 is a modified arrangement of the system shown in Fig. 1.

Referring to Fig. 1, of the accompanying drawings illustrating the application of our device to railway signal systems, the numeral 1 represents the overhead trolley wire or current conductor. Positioned adjacent and parallel this trolley wire, are located suitable contacting devices normally insulated from the trolley wire and so arranged as to be bridged by a traveling current collector W. The trolley contactors X and Z are located a suitable distance in advance of the intersection and are so arranged as to effect the control for starting the signal system in operation. The trolley contactor Y which is located at the intersection is arranged to govern the control for restoring the signals to their normal condition. The trolley contactors X and Z are each provided with two laterally disposed flexible contact members paralleling the conductor 1. The purpose of such an arrangement of parts being such that a traveling current collector successively engaging the two contact members will so effect a suitable relay system whereby a sense of direction will be established. The contact members of the trolley contactors X and Z, and the relay system co-operating therewith, are so arranged that the signal system will be set in operation when a current collector is traveling in the direction indicated by the arrow, and the signal system will not be affected when traversed by a current collector in the opposite direction.

At the intersection the lamps L1, L2, L3 and L4 are arranged on a suitable signal standard and disposed in the line of vision of the vehicular traffic on the highway, to provide the means of displaying a warning signal to the traffic on the highway when an electric railway car is approaching the intersection. The signal lamps L5 and L6 are located in advance of the highway on the railway line and are so arranged to provide a means for notifying the operator of the railway car that the signal lamps located at the intersection have been properly operated.

In the control system we also employ a relay for intermittently energizing the group of signal lamps installed at the intersection and the signal lamps installed in advance of the highway. This relay which is represented by the character D is provided with an operating coil N for influencing its operating armature AN. The armature AN, which is of the oscillating type, is provided with a suitable inertia or flywheel O. The armature AN is also provided with a tube containing mercury, arranged to make and break an electrical circuit between two contacts interposed therein. The flasher relay D is so arranged that the armature AN, mercury tube M, and flywheel O are normally biased to the position indicated in the drawings, by gravity. This may be brought about by counterweighting the flywheel O in such a manner that it will always assume this normal position when the operating coil N is de-energized. It is very obvious, however, that a spring may be substituted to accomplish the same result. The relay is so arranged that the mercury within the tube is normally bridging two electrical contacts located therein, and a circuit is completed through the operating coil N by this contact engagement. The completing of this circuit results in the operating coil N being sufficiently energized so as to cause the armature AN to be attracted. The instant the armature AN is attracted the mercury within the tube is caused to flow from the contacts and the circuit for the operating coil N is opened. As long as current is supplied to the operating coil in this manner the armature AN will continue to operate to and fro, and the circuit will be intermittently opened governed by the period of flywheel O.

In the system we also employ a relay which is of the last-position type, that is, a relay controlling a group of contacts which remain in the actuated position without a normal holding current flowing through the coil. For this relay we have selected the type in which the contact arm is mechanically latched in one position when one operating coil is energized and the latch released to restore the contact arm when the other operating coil is energized. The relay is provided with two operating coils A and C, the operating coil A arranged to affect the armature AA. The armature AA is normally out of contact engagement, and is brought into contact engagement with the front contacts 1G and 13 through the energization of the operating coil A. The armature AA when electrically operated to this position will remain in this position under the influence of the mechanical latch AL. The operating coil C is provided with an armature AC which is likewise normally out of contact engagement with electrical contacts. The armature AC is brought into contact engagement with the front contacts 8 and 5E through an energization of the operating coil C. The armature AC also operates to release the mechanical latch AL on the armature AA and is so arranged that it will return to its normal position as soon as the operating coil C becomes de-energized.

We also employ in this system two sensitive relays provided with operating coils E and F arranged to co-operate with the trolley contactors X and Z for determining the direction in which the railway car is traveling. The relay provided with the operating coil F is provided with an armature AF normally disengaging its front contact 9. The relay provided with the operating coil E is equipped with an armature AE likewise normally disengaging its front contact 11.

Inasmuch as the direction-sensitive relays operate considerably faster than the main control latch relay, we have embodied a time-element relay provided with an operating coil T to prolong the energization of the operating coils A and C of the latch relay, a sufficient time to insure a positive operation of this device. The retarded pickup time-element relay is provided with an armature AT normally engaging its back contact 28. As it is well-known to those skilled in the art, the retarded action of the armature AT may be brought about by various well-known constructed principles such as a copper sleeve placed about the core of the operating coil T, or by suitable dashpot arrangement attached to the armature AT or by an inertia device associated or operating in conjunction with the armature AT. Since the construction of the time-element means for this relay will not affect the operation of our invention we believe the symbolic representation of this device will sufficiently support the disclosure.

With further reference to Fig. 1, attention is directed to the novel arrangement of the electrical circuits associated with the operating coils E and F of the relays governing the energization of the setting circuit depending upon the direction the current collector W is traveling. With further reference to Fig. 1, it will be noted that the current collector W approaching the trolley contactor X, in the direction of the arrow, will first come into contact engagement with the contact member 3 and a circuit will be completed for the energization of the operating coil F. This circuit will be completed from the overhead trolley conductor 1, through the current collector W, contact member 3 of trolley contactor X, wire 3A, wire 3B, disconnecting switch 3C, wire 3D, operating coil F, wire 27, resistance R to the ground G. The energization of the operating coil F will cause the armature AF to be brought into contact engagement with its front contact 9. No change in the electrical circuits will occur at this time, but as soon as the current collector W continues and comes into contact engagement with the contact member 2 of the trolley contactor X, a circuit will be completed for energization the operating coil E and retaining the energization of the operating coil F. This circuit will be completed from the overhead trolley conductor 1, through the current collector W, through the contact member 2 of trolley contactor X, through wires 2A, wire 2B, disconnecting switch 2C, wire 2D, operating coil E, wire 10, front contact 9, armature AF, wire 3E, operating coil F, wire 27, resistor R to the ground G. The energization of the operating coil E will cause the armature AE to be brought into contact engagement with its front contact 11. No change will occur in the circuit at this instant, but as soon as the current collector W disengages the contact members of the trolley contactor X, a circuit will be established for the energization of the operating coil A of the main control latch relay and for retaining the energization of the operating coils of the direction-sensitive relays for a predetermined time. Simultaneous with this operation, a circuit will likewise be established through the operating coil of the time element relay for governing the time of current application in this circuit. This circuit will be completed from the overhead trolley conductor 1, through wire 1A, disconnecting switch 1B, protective fuse 1C, wire 1D, wire 1E, back contact 28 of the retarded time element relay, armature AT of the time element relay, wire 4, operating coil T of the time element relay, wire 6, operating coil A of the main control latch relay, wire 12, front contact 11 of the direction-sensitive relay, wire 2E, operating coil E, wire 10, front contact 9, armature AF, wire 3E, operating coil F, wire 27, resistor R to the ground G. After a predetermined time the armature AT will be brought out of contact engagement with the normally engaged back contact 28 and the circuit described will be interrupted at this point, and the relays of the system will be restored to their normally de-energized condition.

Should the current collector W traverse either of the trolley contactors X or Z in a direction opposite to that indicated by the arrows, the direction-sensitive relay control will not be affected in such a manner as to select an operation of the main control latching relay. When the current collector W approaches the trolley contactor Z in a direction opposite to that shown by the arrow, which is the case when the vehicle is leaving the intersection, the contact member 2F will be first engaged but neither of the direction-sensitive relays E or F will be affected. As the curent collector continues it will come into contact engagement with the contact member 3F and a circuit will be established for the energization of the operating coil F. This circuit will be completed from the trolley conductor 1, through the current collector W, through the contact member 3F, wire 3G, wire 3B, disconnecting switch 3C, wire 3D, operating coil F, wire 27, resistance unit R to the ground G. The energization of the operating coil F or the operation of its armature AF will not produce a change in any of the control circuits and as soon as the current collector W disengages the contact members of the trolley contactor Z, the armature AF and the operating coil F will be restored to normal.

In normal operation the current collector W passing either of the trolley contactors X or Z in the direction indicated by the arrows, will so affect the relay system as to cause the signal control to be set into operation. As the current collector W passes the intersection in either direction, it will come into contact engagement with the trolley contactor Y, and the relay system will be affected in such a manner as to cause the signals to be restored to normal. The circuit for restoring the system to normal will be completed from the trolley conductor 1 through the current collector W, through the contact member 5 of trolley contactor Y, disconnecting switch 5B, wire 5C, wire 5A, disconnecting switch 5B, wire 5C, operating coil C of the main control latch relay, wire 25, resistance unit R1 to the ground G. The completion of this circuit will energize the operating coil C, and the armature AC will be raised into contact engagement with its front contacts 8 and 5E. As soon as the current collector disengages the trolley contactor Y, a circuit will be established for retaining the energization of the operating coil C for a predetermined time. This circuit will be completed from the trolley conductor 1, through wire 1A, disconnecting switch 1B, protective fuse 1C, wire 1D, wire 1E, back contact 28 of the retarded pick-up relay, armature AT, wire 4, operating coil T of the retarded pick-up relay, wire 6, wire 7, front contact 8, armature AC of the main control latch relay, front contact 5E, wire 5D, operating coil C, wire 25, resistance unit R1 to the ground G. As soon as the armature AC was brought into contact engagement with the front contacts 8 and 5E, the armature likewise engaged the tripping lever of the mechanical latch AL, and the armature AA was restored to its normal position. After a predetermined time the armature AT of the retarded pick-up relay will disengage its back contact 28 and the operating circuit of the coil C will be interrupted and the relay system will be restored to normal.

While the armature AA was mechanically latched in contact engagement with its front contacts 1G and 13, a circuit was completed for the operation of the signal lamps installed at the highway. This circuit was completed from the trolley conductor 1, through wire 1A, disconnecting switch 1B, protective fuse 1C, wire 1D, wire 1F, front contact 1G, armature AA, front contact 13, wire 14, flexible connector 15, through the mercury tube M of the flasher relay D, flexible connector 16, wire 17, operating coil N of the flasher relay D, wire 18, wire 22, highway signal lamp L1, wire 23, signal lamp L2, wire 24, pilot lamp L6 to the ground G. A divided circuit was formed at the connection of wires 18 and 22, feeding through wire 19, signal lamp L3, wire 20, signal lamp L4, wire 21, pilot lamp L5 to the ground G. It will likewise be noted that the current for the energization of the highway signal lamps L1, L2, L3 and L4, and the pilot lamps L5 and L6, was taken through the operating coil N of the flasher relay D, and as was previously described, the energization of the operating coil N of the relay D will cause the armature AN to oscillate in such a manner as to cause the current in this circuit to be periodically interrupted. By placing the pilot lamps L5 and L6 in series with the signal lamps installed in the main highway, a safe and dependable indication is provided to indicate to the operator of the railway car the condition of the indications at the main highway.

The system shown in Fig. 2 is a modification of the system shown in Fig. 1, illustrating the method of employing such a relay control on a double track railway system. With reference to Figure 2, it will be noted that the highway signal lamp and pilot circuits are identical to those described in Fig. 1, and like numerals and characters have been employed to identify the similar parts. Inasmuch as two railway cars may be approaching the intersection at the same time on the different tracks, separate main control latch relays have been employed for each of the tracks. It has also been found through practice, advisable to employ separate time element relays for each of the main control latch relays, to insure the proper energization of the operating coils, should the current collectors engage the trolley contactors simultaneously. Inasmuch as the railway cars travel in one direction only on each of the tracks, the direction-sensitive control is not employed on the double track system, but the sensitive relays E and W are employed to insure the operation of the setting control magnets A and A1 of the main control latch relays.

The current collector W approaching the intersection on the trolley wire 1 in the direction indicated by the arrow will first come into contact engagement with the trolley contactor U, and will affect the relay control for starting the signal in operation. This circuit will be completed from the trolley conductor 1, through the current collector W, through the contact member 3 of trolley contactor U, through wire 3A, disconnecting switch 3B, wire 3C, wire 3D, operating coil E, resistance unit R to the ground G. As soon as the current collector W disengages the trolley contactor U, a circuit will be completed for the energization of the operating coil A of the main control latching relay. This circuit will be completed from the trolley conductor 1, through wire 1A, disconnecting switch 1B, protective fuse 1C, wire 1D, wire 1K, back contact 1L of the retarded pick-up time element relay, armature AT, wire 4, operating coil T, wire 5, operating coil A of the main control latching relay, wire 6, armature AE of the setting control relay, front contact 3E, wire 3D, operating coil E, resistance unit R to the ground G. After a pre-determined time the armature AT of the retarded pick-up time element relay will disengage the back contact 1L, and the setting control circuit will be interrupted at this point. The energization of the operating coil A as just described will result in the armature AA of the main control latching relay being raised into contact engagement with its front contacts 1G and 1G, and as was described under Fig. 1, the armature will remain latched in this position under the influence of the mechanical latch AL. As long as the armature AA remains in this mechanically latched position, a circuit will be established through the operating coil N of the flasher relay D, for intermittently energizing the signal lamps L1, L2, L3 and L4, and the pilot lamps L5 and L6 as previously described in Fig. 1. As soon as the current collector W clears the intersection it will come into contact engagement with the overhead trolley contactor Y and effect the control for restoring the signal indications to their normal condition. This clearing control and circuit is identical to that described in Fig. 1 and since like numerals and characters have been employed to identify the similar parts, a further description of this operation is not necessary.

Should the current collector W approach the intersection on the trolley wire 1T in the direction indicated by the arrow, it will first come into contact engagement with the overhead trolley contactor V, thereby completing a circuit for the energization of the operating coil W effecting the control for energizing the operating coil A1 of the main control latching relay. This established circuit will start the signal system into operation as was previously described for the current collector traveling on the trolley wire 1. As soon as the current collector clears the intersection, it will come into contact engagement with the overhead trolley contactor Y1 and a circuit will be completed through the operating coil C1 of the main control latching relay to restore the system to normal. The distinctive feature set forth in Fig. 2 is the employment of the retarded pick-up time element relays T and T1 to prolong the energization of the operating coils of the main control latching relays, a sufficient time to always insure the proper operation of these devices, irrespective of the time of contact engagement the current collector established with the various overhead trolley contacting devices.

The system shown in Fig. 3 illustrates the application of the direction-sensitive control to the main control latching relay, without employing an auxiliary retarded pick-up relay to insure the operation of the relays. A system of this nature might often be employed when the traveling current collector is moving much slower than is possible with the relay system described and disclosed under Figs. 1 and 2. In Fig. 3 all the safety features of the circuits have been retained with the exception of the application of the mentioned retarded pick-up relay. In this system the overhead trolley contactors X and Z are identical to those employed in Fig. 1, and are used to effect the relay control for starting the signal in operation when the current collector W is approaching the intersection in the direction of the arrows. The overhead trolley contactor Y is likewise identical to that employed in Fig. 1 and is used for effecting the relay control for restoring the entire system to normal. With further reference to Fig. 3, it will be noted that the current collector W approaching the intersection will come into contact engagement with contact member 3 of the trolley contactor X and a circuit will be completed for the energization of the operating coil E of the directional control relay. This circuit will be completed from the trolley conductor 1 through the current collector W, through the contact member 3 of the trolley contactor X, through wire 3A, wire 3B, disconnecting switch 3C, wire 3D, operating coil E, wire 27, resistance unit R to the ground G. As soon as the current collector disengaged the contact member 3 and comes into contact engagement with the contact member 2 of the trolley contactor X, a circuit will be completed for the energization of the operating coil A of the main control latching relay. This circuit will be completed from the current conductor 1, through the current collector W, through the contact member 2, through wire 2A, wire 2B, disconnecting switch 2C, wire 2D, armature AE of the directional control relay, front contact 9, wire 10, operating coil A of the main control latching relay, wire 3E, operating coil E, wire 27, resistance unit R to ground G. The energization of the operating coil A will result in the armature AA of the main control latching relay being brought into contact engagement with its contacts 1D and 13. As soon as the current collector disengages the trolley contactor X, the operating coils A and E will become de-energized but the armature AA will remain in contact engagement with the front contacts 1D and 13 under the influence of the mechanical latch AL. As long as the armature AA is in contact engagement with these contacts, a circuit will be established through the operating coil N of the flasher relay D for intermittently energizing the signal lamps installed at the highway and the pilot lamps installed on the electric railway line. Inasmuch as the circuit is identical to that shown and described for Fig. 1 and since like numerals and characters have been employed to identify the similar parts, a further description of this circuit is not necessary. As soon as the current collector continues it will come into contact engagement with the trolley contactor Y installed at the highway intersection, and a circuit will be completed for the energization of the main control latching relay. This circuit will be completed from the overhead conductor 1, through the current connector W, through the contact member 5 of contactor Y, through wire 5A, disconnecting switch 5B, wire 5C, operating coil C of the main control latching relay, wire 25, resistance unit R1 to the ground G. The energization of the operating coil C will cause the armature AC of the main control latching relay to engage the tripping lever of the mechanical latch AL and thereby release the mechanical latch maintained on the armature AA. As soon as the current collector disengages the trolley contactor Y, the armature AC and the mechanical latch AL will be restored to their normal positions. After the current collector leaves the protected zone and comes into contact engagement with the trolley contactor Z, it will first come into contact engagement with the contact member 2F. This contact engagement will not affect any of the circuits of the control system, but as soon as the current collector continues and comes into contact engagement with the contact member 3F of the overhead trolley contactor Z, a circuit will be completed for the energization of the operating coil E. This energization of the operating coil E will not affect the starting control of the system since a successive contact engagement of the contact members 3 and 2 of the overhead trolley contactor X and the contact members 3F and 2F of the trolley contactor Z in the directions indicated by the arrows is necessary to affect the starting control.

Attention is directed to the merits obtained in the use of a direction-sensitive control employing the principles outlined in Figs. 1 and 3. In the system it will be noted that it is necessary to maintain a successive engagement in a predetermined direction in order to establish the sequence of operations necessary to affect the starting control. This is a very desirable feature since it is impossible to produce a false starting operation by the current collector traveling in a direction opposite to that indicated by the arrows. Heretofore this objection has been inherent in the various directional controls employed, and many complicated additions have been resorted to, in an attempt to correct this difficulty. It will also be seen by referring to the drawings that a failure of any contact, the opening of any wire or resistor will render the starting control inoperative, and likewise prevent a false starting operation through the failure of any of the elements included in this control. In the double-track system indicated in Fig. 2, attention is directed to the employment of the retarded pick-up time element relays to insure a positive operation of the main control magnets. Heretofore, it has been found that wheels engaging trolley contacting devices make very indifferent contacts resulting in the control relays being improperly operated. By employing a very sensitive relay to be actuated by the current collector for remotely controlling the main control relay for a predetermined time, a positive operation of the main control is always assured.

There are, of course, many modifications and arrangements of the parts which may be made from that shown in the above disclosure as is indicated in the modifications shown in the inclosed drawings which it is believed will still fall within the scope of our invention.

We claim:

1. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground, means whereby both of said relays operate when the said contact members are successively engaged in one direction to select the operation of the said signal control relay, and only one of the said relays to be actuated when the said members are engaged in the opposite direction.

2. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground.

3. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground, means whereby both of said relays are actuated when the said contact members are successively engaged in one direction only.

4. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground through a branch of the first said circuit.

5. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground through a branch of the first said circuit, means whereby both of said relays are energized when the said contact members are successively engaged in one direction and only one of the said relays are energized when the said members are engaged in the opposite direction.

6. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground through a branch of the first said circuit, means whereby both of said relays are energized when the said contact members are successively engaged in one direction to select the operation of the said signal control relay and only one of the said relays is energized when the said members are engaged in the opposite direction, and means whereby the first mentioned circuit remains energized for a predetermined time after the said movable element disengages the said vehicle controlled switch.

7. In a signal system, the combination with a signal, of relays controlling said signal, a current conductor, a vehicle controlled switch comprising a pair of contact members located adjacent to the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground, means whereby both of said relays operate when the said contact members are successively engaged in one direction to select the operation of the said signal control relay, and only one of the said relays to be actuated when the said members are engaged in the opposite direction, and means whereby the first mentioned circuit remains energized for a predetermined time after the said movable element disengages the said vehicle controlled switch.

8. In a signal system, the combination with a signal, of relays controlling said signal, a current conductor, a vehicle controlled switch located adjacent the said conductor and insulated therefrom adapted to be actuated by a movable member traveling on the said conductor, a normally open circuit including a relay connecting the said vehicle controlled switch and ground, another circuit including a time element relay, a normally closed contact of the said time element relay, and a normally open contact of the first mentioned relay for connecting the said current conductor and ground through the first mentioned circuit, and means whereby the said another circuit remains energized for a predetermined time after the said movable element disengages the said vehicle controlled switch.

9. In a control system, the combination of a source of power, a vehicle controlled switch comprising a pair of contact members normally insulated from the source of power and being insulated from each other, the said contact members being so arranged as to be successively engaged by a member of a moving vehicle for connecting the contact members of the said vehicle controlled device to the source of power, a normally open circuit including a relay connecting one of the said contact members and the return to the source of power, and another circuit including a second relay and a normally open contact of the first mentioned relay connecting the other contact member to the said return through the first mentioned circuit.

10. In a signal system, the combination of a signal, of relays controlling the said signal, a source of power, a vehicle controlled switch adapted to be engaged by a moving vehicle, a normally open circuit including a relay connecting the vehicle controlled switch and ground arranged to be connected to the source of power when the said vehicle controlled switch is engaged by a moving vehicle, and a second relay, having a circuit including a normally closed contact of the said second relay, a normally open contact of the first mentioned relay and a branch of the first said circuit.

11. In a signal system, the combination of a signal, of relays controlling the said signal, a source of power, a vehicle controlled switch adapted to be engaged by a moving vehicle, a normally open circuit including a relay arranged to be connected to the source of power when the said vehicle controlled switch is engaged by a moving vehicle, and a second relay, having a circuit including a normally closed contact of the said second relay, a normally open contact of the first mentioned relay and a branch of the first said circuit, for retaining the first said circuit connected to the source of power for a predetermined time after the vehicle disengages the said vehicle controlled switch.

12. In a signal system, the combination of a signal, of relays controlling the said signal, a source of power, a vehicle controlled switch adapted to be engaged by a moving vehicle, a normally open circuit including a relay arranged to be connected to the source of power when the said vehicle controlled switch is engaged by a moving vehicle, and a second relay, having a circuit including a normally closed contact of the said second relay, a normally open contact of the first mentioned relay and a branch of the first said circuit, for retaining the first said circuit connected to the source of power after the vehicle disengages the said vehicle controlled switch.

13. In a signal system, the combination with a signal, of relays controlling said signal, a current conductor, a vehicle controlled switch comprising a pair of contact members located adjacent the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground, means whereby both of said relays operate when the said contact members are successively engaged in one direction to select the operation of the said signal control relay, and only one of the said relays to be actuated when the said members are engaged in the opposite direction, and means whereby the first mentioned circuit remains energized after the said movable element disengages the said vehicle controlled switch.

14. In a signal system, the combination with a signal, of relays controlling said signal, a current conductor, a vehicle controlled switch comprising a pair of contact members located adjacent the said conductor and being insulated therefrom and from each other, said contact members so arranged as to be successively engaged by a movable member adapted to travel upon the said conductor, a normally open circuit including a relay connecting one of the said contact members and ground, another circuit including a second relay and a normally open contact of the first mentioned relay connecting the other contact member and ground through a branch of the first said circuit, means whereby both of said relays are energized when the said contact members are successively engaged in one direction to select the operation of the said signal control relay and only one of the said relays is energized when the said members are engaged in the opposite direction, and means whereby the first mentioned circuit remains energized after the said movable element disengages the said vehicle controlled switch.

15. In a control system, the combination of a source of power, a vehicle controlled switch comprising a pair of contact members arranged to be successively engaged by a moving vehicle, a normally open circuit including a relay so connecting one of the said contact members that the said relay will be connected to the source of power when the vehicle engages the said contact member, and a second circuit including a second relay so connecting a normally open contact of the first mentioned relay and the other contact member of the vehicle switch that both of the said relays will be connected to the source of power when the vehicle disengages the first contact member and engages the said second contact member.

16. In a control system, the combination of a source of power, a plurality of relays, a vehicle controlled switch comprising a pair of contact members arranged to be successively engaged by a moving vehicle, a normally open circuit so connecting one of the said contact members that one of the said relays will be connected to the source of power when the vehicle engages the said contact member, and a second relay having circuit connections to another one of the said contact members and a normally open contact of the first mentioned relay whereby both of the said relays will be connected in series and to the source of power when the vehicle disengages the first contact member and engages the said second contact member.

17. In a control system, the combination of a source of power, a vehicle controlled switch comprising a pair of contact members arranged to be successively engaged by a moving vehicle, a normally open circuit including a relay, connecting one of the said contact members and the return of the source of power, another circuit including a relay and a contact of the first mentioned relay, connecting the other contact member and the return of the source of power, means whereby both of said relays are actuated when the said contact members are successively engaged in one direction only.

18. In a signal system, the combination of a signal, a source of power, a vehicle controlled switch comprising a pair of contact members arranged to be successively engaged by a moving vehicle, a normally open circuit including a relay and one of the said contact members, another circuit including a second relay and another one of said contact members, means whereby both of said relays operate when the said contact members are successively engaged in one direction to select the operation of the said signal control relay, and only one of the said relays to be actuated when the said contact members are engaged in the opposite direction.

19. In a signal system, the combination with a signal, of relays controlling said signal, a source of power, a current conductor, a vehicle controlled switch comprising a pair of contact members to be successively engaged by a moving vehicle, a normally open circuit including a relay connecting one of said contact members and the return connection of the source of power, and another circuit including a second relay and a contact of the first mentioned relay connecting the other contact member and the return connection of the source of power.

20. In a signal system, the combination with a signal, of relays controlling said signal, a current conductor, a vehicle controlled switch located adjacent the said conductor and insulated therefrom adapted to be actuated by a movable member traveling on the said conductor, a normally open circuit including a relay connecting the said vehicle controlled switch and ground, another circuit including a time element relay, a normally closed contact of the said time element relay and a normally open contact of the first mentioned relay for connecting the said current conductor and ground through the first mentioned circuit, and means whereby the said another circuit remains energized after the said movable element disengages the said vehicle controlled switch.

In testimony whereof we affix our signatures.

FRANK H. RICHTERKESSING.
ROBERT S. BOWEN.